United States Patent
Zhao et al.

(10) Patent No.: US 9,789,758 B2
(45) Date of Patent: Oct. 17, 2017

(54) OPTIMIZED ARRANGEMENT OF FRONT COMPARTMENT OF A HYBRID VEHICLE

(71) Applicant: BYD COMPANY LIMITED, Shenzhen, Guangdong (CN)

(72) Inventors: Ziqiang Zhao, Shenzhen (CN); Pan Lin, Shenzhen (CN); Changjiu Liu, Shenzhen (CN)

(73) Assignee: BYD COMPANY LIMITED, Pingshan, Shenzhen, Guangdong (CN)

( * ) Notice: Subject to any disclaimer, the term of this patent is extended or adjusted under 35 U.S.C. 154(b) by 0 days.

(21) Appl. No.: 14/883,270

(22) Filed: Oct. 14, 2015

(65) Prior Publication Data

US 2016/0031308 A1   Feb. 4, 2016

Related U.S. Application Data

(63) Continuation of application No. PCT/CN2014/071161, filed on Jan. 22, 2014.

(30) Foreign Application Priority Data

Apr. 16, 2013   (CN) .................... 2013 2 0193326 U

(51) Int. Cl.
*B60K 6/40* (2007.10)
*B60H 1/00* (2006.01)
(Continued)

(52) U.S. Cl.
CPC .......... *B60K 6/40* (2013.01); *B60H 1/00321* (2013.01); *B60K 11/04* (2013.01); *B62D 5/04* (2013.01);
(Continued)

(58) Field of Classification Search
CPC ... B60K 1/02; B60K 6/40; B60K 6/42; B60K 6/05

See application file for complete search history.

(56) References Cited

U.S. PATENT DOCUMENTS

| | | | | |
|---|---|---|---|---|
| 5,947,435 A | * | 9/1999 | Small | B60R 16/0239 248/221.11 |
| 6,019,183 A | * | 2/2000 | Shimasaki | B60K 6/48 180/165 |
| 2004/0254039 A1 | * | 12/2004 | Yasui | B60K 6/365 475/5 |

FOREIGN PATENT DOCUMENTS

| | | |
|---|---|---|
| CN | 102114763 A | 7/2011 |
| CN | 202071897 U | 12/2011 |

(Continued)

OTHER PUBLICATIONS

Byd Company Ltd., ISR, PCT/CN2014/071161, dated May 5, 2014, 3 pgs.

*Primary Examiner* — John Walters
*Assistant Examiner* — James Triggs
(74) *Attorney, Agent, or Firm* — Morgan, Lewis & Bockius LLP

(57) ABSTRACT

A hybrid vehicle, a front cabin and a method for controlling the front cabin are provided. The front cabin includes: a sheet metal and a front subframe. The front cabin is configured to house an engine, a motor, a motor controller, a transmission and a support assembly. The engine and the motor are connected to the transmission respectively; the engine is disposed on the right side of the front cabin; the transmission is disposed on the left side of the front cabin; the motor is disposed on the left side of the front cabin and above the transmission; and the motor controller is disposed above the transmission and located at the front of the motor.

4 Claims, 7 Drawing Sheets

(51) Int. Cl.
*B60K 11/04* (2006.01)
*B62D 5/04* (2006.01)
*B62D 21/11* (2006.01)
B60K 6/405 (2007.10)
B60K 11/02 (2006.01)

(52) U.S. Cl.
CPC .............. *B62D 21/11* (2013.01); *B60K 6/405* (2013.01); *B60K 11/02* (2013.01); *Y02T 10/92* (2013.01); *Y10S 903/951* (2013.01)

(56) References Cited

FOREIGN PATENT DOCUMENTS

| | | |
|---|---|---|
| CN | 203222035 U | 10/2013 |
| FR | 2917051 A1 | 12/2008 |
| JP | 2001063493 A | 3/2001 |
| JP | 2010000852 A | 1/2010 |

* cited by examiner

OPTIMIZED ARRANGEMENT OF FRONT COMPARTMENT OF A HYBRID VEHICLE

CROSS REFERENCE TO RELATED APPLICATION

This application is a continuation application of International Application No. PCT/CN2014/071161, filed with the State Intellectual Property Office of P. R. China on Jan. 22, 2014, which claims priority to and benefits of Chinese Patent Application No. 201320193326.1, filed with the State Intellectual Property Office of P. R. C. on Apr. 16, 2013, the entire contents of which are incorporated herein by reference.

TECHNICAL FIELD

The present disclosure relates to the field of hybrid vehicle, and more particularly to the front cabin of a hybrid vehicle and a hybrid vehicle having the same.

BACKGROUND

Hybrid vehicle combines the advantages of the fuel and electric vehicles, with a high performance. How to well arrange the various components in the front cabin of the hybrid vehicle becomes the focus of hybrid automobile arrangement. The conventional arrangement of the front cabin has the disadvantages such as insufficient space utilization, uneven quality distribution, uneven temperature field distribution, poor security and lager vibration of the electric compressor.

SUMMARY

Embodiments of the present disclosure seek to solve at least one of the problems existing in the related art to at least some extent.

Embodiments of the present disclosure provide a front cabin of a hybrid vehicle. The front cabin includes a sheet metal and a front subframe. An engine, a motor, a motor controller, a transmission and a support assembly are disposed within the front cabin. The engine and the motor are coupled to the transmission, respectively. The engine is disposed on the right side of the front cabin. The transmission is disposed on the left side of the front cabin. The motor is disposed on the left side of the front cabin and above the transmission. The motor controller is disposed on the transmission and located at the front of the motor.

Embodiments of the present disclosure further provide a vehicle. The vehicle includes the front cabin as previously described.

With the front cabin of the hybrid vehicle and the hybrid vehicle according to embodiments of the present disclosure, the motor, the engine and the transmission are reasonably arranged in the front cabin, which may improve the space utilization of the front cabin and each component is securely disposed within the front cabin. And it also has the advantages of balancing the quality and temperature distribution, reducing the energy consumption and cost by combining the electric drive systems and fuel drive system. Besides, it also has the advantages of facilitating the integration of power from the engine and motor, and power output of the transmission, thus improving the performance of the hybrid vehicle.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
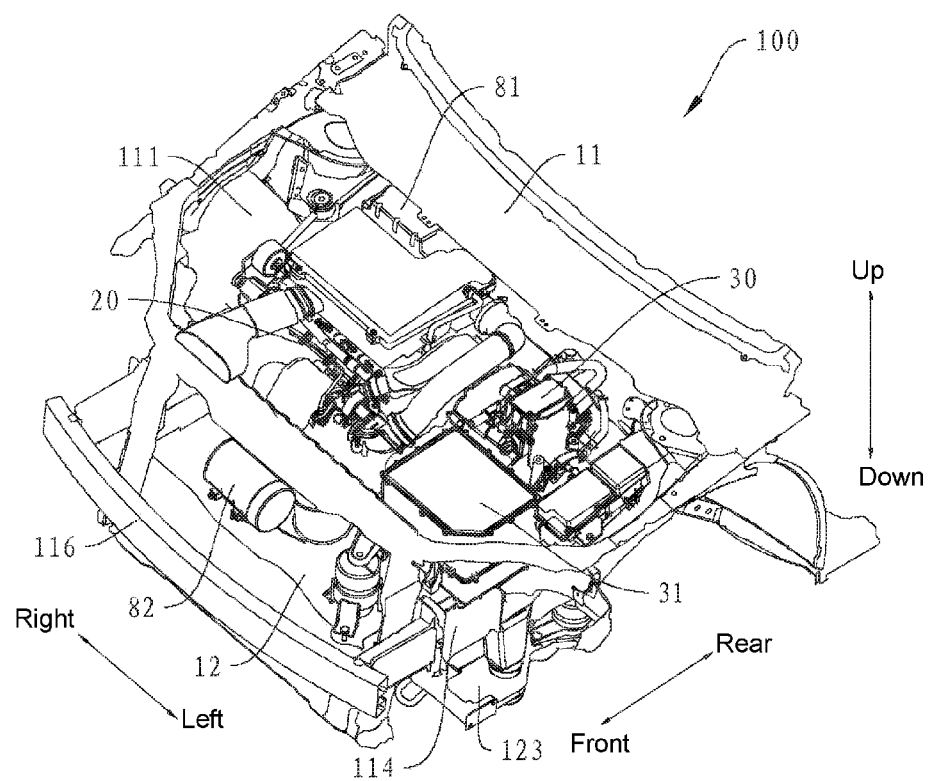
FIG. 1 is a schematic partial view of a front cabin of a hybrid vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure include all the variants, modifications and their equivalents within the spirit and scope of the present disclosure as defined by the claims.

Figure 2:
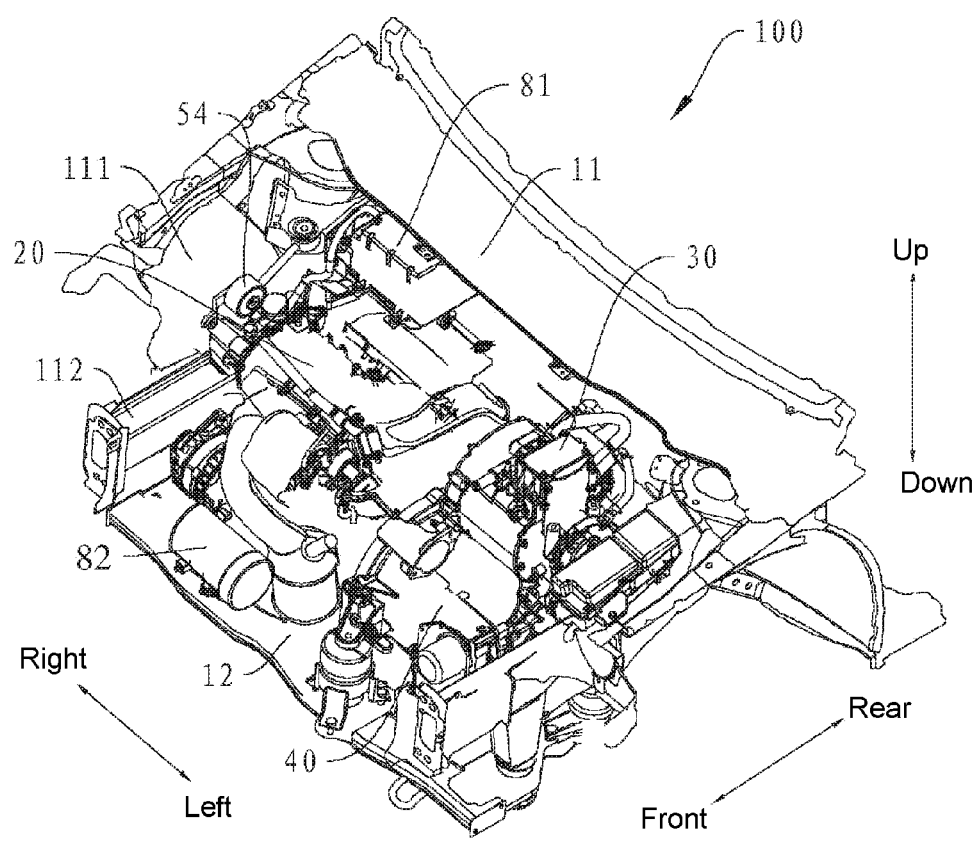
FIG. 2 is a schematic partial view of a front cabin of a hybrid vehicle according to an embodiment of the present disclosure.

As shown in FIGS. 1 and 2, is a front cabin 100 of a hybrid vehicle according to an embodiment of the present disclosure. The front cabin 100 includes a sheet metal 11 and a front subframe 12. An engine 20, a motor 30, a motor controller 31, a transmission 40 and a support assembly 5 are disposed within the front cabin 100. The engine 20 and the motor 30 are connected to the transmission 40 respectively. The engine 20 is disposed on the right side of the front cabin 100. The transmission 40 is disposed on the left side of the front cabin 100. The motor 30 is disposed on the left side of the front cabin 100 and above the transmission 40. The motor controller 31 is disposed on the transmission 40 and located at the front of the motor 30.

With the front cabin 100 according to embodiments of the present disclosure, the motor 30, the engine 20 and the transmission 40 are reasonably arranged in the front cabin 100, which may improve the space utilization of the front cabin 100, and each component is securely disposed within the front cabin 100. It also has the advantages of balancing the quality and temperature distribution, reducing the energy consumption and cost by combining the electric drive systems and fuel drive system. Besides, it also has the advantages of facilitating the integration of power from the engine 20 and motor 30, and power output of the transmission 40, thus improving the performance of the hybrid vehicle.

As shown in FIG. 2, in some embodiments, in order to mount the motor controller 31, the motor 30 is located at the rear side of the top of the transmission 40 to define a mounting space between the motor 30 and the sheet metal 11 to house the motor controller 31 in the mounting space. Thus, the position of the motor 30 is arranged to facilitate the installation of the motor controller 31, thereby increasing the mounting efficiency of the hybrid vehicle, and improving the stability of the hybrid vehicle.

As shown in FIG. 2, in some embodiments, an outer diameter of the upper end of the motor 30 is less than an outer diameter of the of the lower end of the transmission 40, so that the front portion of the motor 30 and the sheet metal 11 may form the mounting space therebetween to house the motor control 31.

Figure 3:
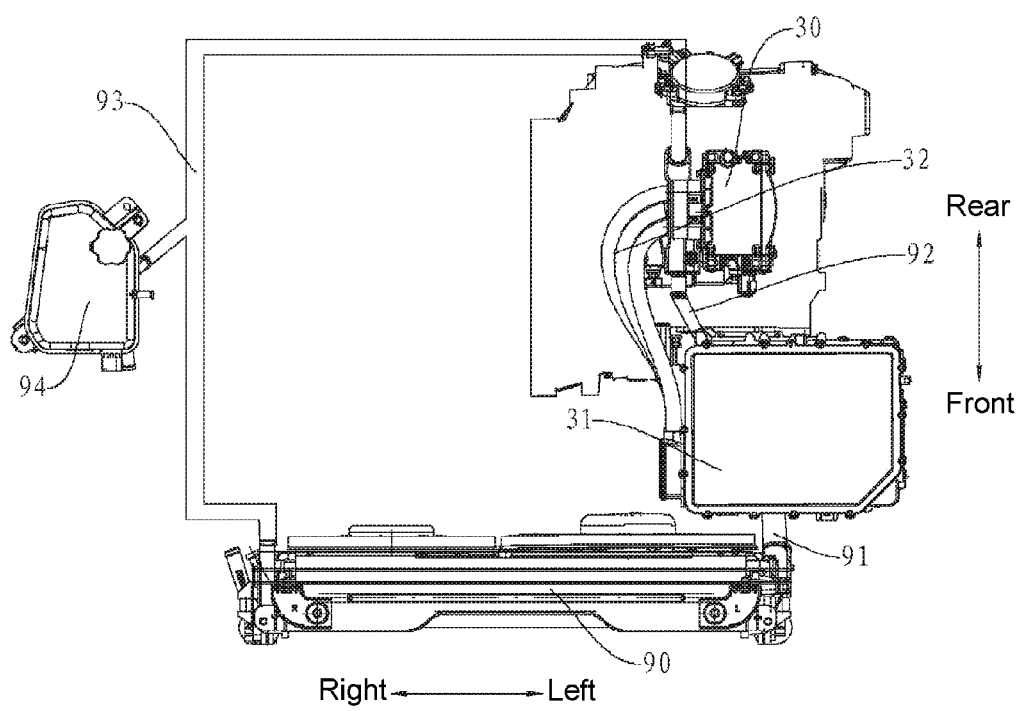
FIG. 3 is a schematic partial view of a front cabin of a hybrid vehicle according to an embodiment of the present disclosure illustrating the layout of a motor, a motor controller, a radiator and an expansion pot.

In some embodiments, as shown in FIG. 3, the motor controller 31 of the motor 30 is disposed at the front portion of the motor 30, to connect a wiring harness 32 between the motor 30 and the motor controller 31, which may reduce the length of the wiring harness 32 and reduce cost.

In some embodiments, a motor housing of the motor and a transmission housing of the transmission are formed integrally, which simplifies the structure of the motor 30 and the transmission 40, facilitates the coordination and assembly between the motor 30 and the transmission 40 and improves the cooperate precision between the motor 30 and the transmission 40.

In some embodiments, the integrally formed housing of the motor 30 and the transmission 40 is connected to the engine 20 by a bolt, which may facilitate the assembly and disassembly of the hybrid vehicle, improve the manufacture efficiency and facilitate the maintenance of the hybrid vehicle.

Figure 7:
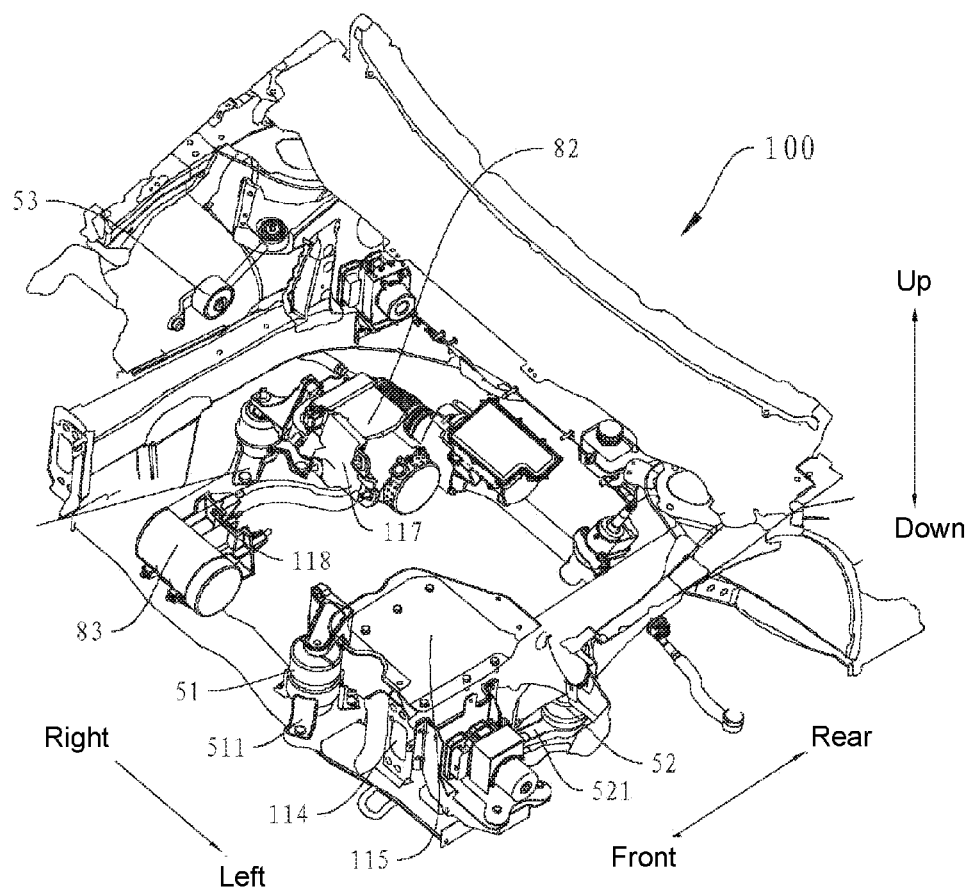
FIG. 7 is a schematic partial view of a front cabin of a hybrid vehicle according to an embodiment of the present disclosure.

In some embodiments, as shown in FIG. 7, a motor controller bracket 115 is disposed on a left side longitudinal beam of a body 114 of the hybrid vehicle, the motor controller 31 is mounted on the left side longitudinal beam of the body 114 by the motor controller bracket 115, which may facilitate the mounting of the motor controller 31 and improve the mounting efficiency.

Figure 4:
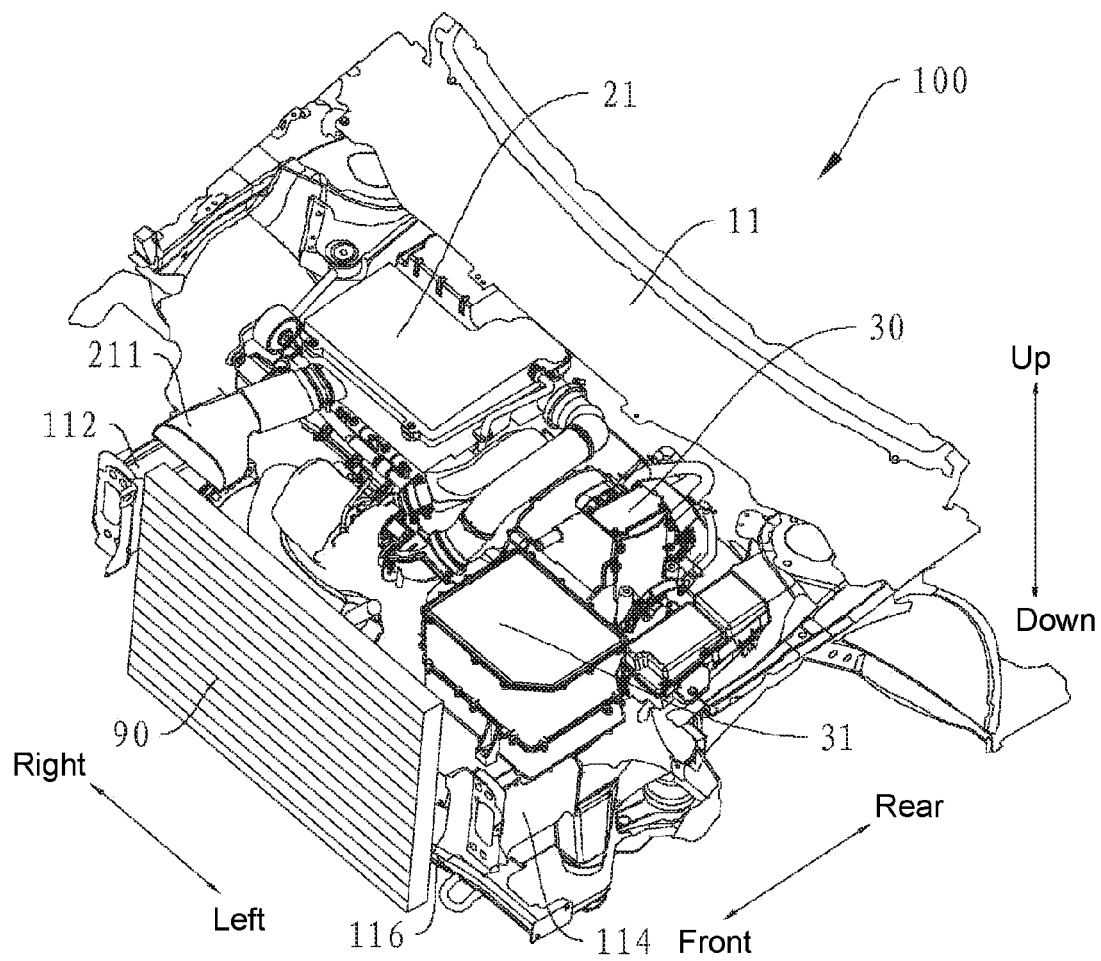
FIG. 4 is a schematic view of a front cabin of a hybrid vehicle according to an embodiment of the present disclosure.

In some embodiments, as shown in FIGS. 3 and 4, the front cabin further includes a radiator 90. An outlet 902 of the radiator 90 is connected to an inlet 311 of the motor controller 31, and the inlet 311 of the motor controller 31 is connected to the outlet 302 of the motor 30, and the outlet 302 of the motor 30 is connected to the inlet 901 of the radiator 90. In other words, as shown in FIG. 3, the outlet 312 of the motor controller 31 is connected to the inlet 301 of the motor 30 through a first conduit 91, and the outlet 312 of the motor controller 31 is connected to the inlet 301 of the motor 30 through a second conduit 92, and the outlet 302 of the motor 30 is connected to the inlet 901 of the radiator 90 through a third conduit 93. The radiator 90, the motor controller 31 and the motor 30 is connected end to end to form a circulating water cooling circuit. Therefore the cooling of the motor controller and the motor is realized by water cooling, which may facilitate the rapid cooling of the motor and the motor controller and improve the safety and security of the hybrid vehicle.

In some embodiments, as shown in FIGS. 1, 3 and 4, the front cabin further includes a tank cross member 116. The radiator 90 is disposed on the tank cross member 116. The inlet 311 of the motor controller 31 is adjacent the outlet of the radiator 90, and the outlet 312 of the motor controller 31 is adjacent the inlet 301 of the motor 30. Therefore the radiator 90 is directly connected to the motor controller 31 to reduce the length of the conduit and improve the radiation performance and the connection stability, reducing the failure rate.

In some embodiments, as shown in FIG. 3, the front cabin further includes an expansion pot 94, and an opening of the expansion pot 94 is disposed between the outlet 302 of the motor 30 and the inlet 901 of the radiator 90, which may further improve the radiation performance of the radiator 90 and to cool the motor 30 and the motor controller 31 rapidly.

In some embodiments, the radiator 90 includes two outlets and two inlets, one of the two inlets of the radiator 90 is connected to the inlet of the motor controller 31, and the other inlet of the radiator 90 is connected to the inlet of the motor 30. One of the two outlets of the radiator 90 is connected to the outlet of the motor 30, and the other outlet of the radiator 90 is connected to the outlet of the motor 30.

In some embodiments, the radiator 90, the motor controller 31 and the motor 30 are connected to each other in series to form a cooling water circuit, and the cooling water circuit is used to form a cooling system between the motor controller 31 and the motor 30, and the expansion pot 94 is connected between the outlet 302 of the motor 30 and the inlet 901 of the radiator 90. The radiator 90 is directly connected to the motor controller 31, and the motor controller 31 is directly connected to the motor 30, so as to cool the motor controller 31 first, and the performance of the cooling water reaches max, and the conduit is optimized to be short to improve the cooling performance.

Figure 5:
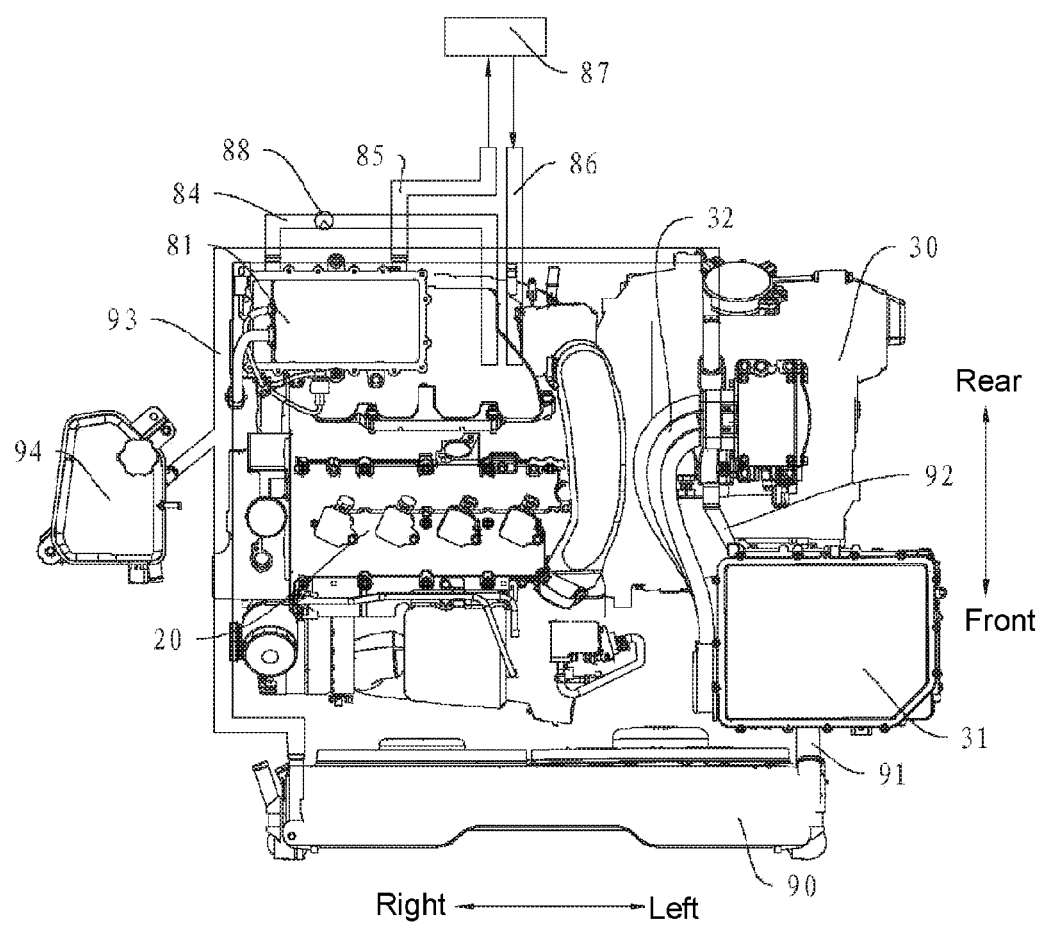
FIG. 5 is a schematic view of a front cabin of a hybrid vehicle according to an embodiment of the present disclosure.

In some embodiments, as shown in FIG. 5, an air conditioning system of the vehicle comprises a heater core 87, and a heater 81 is provided in the front cabin 100. The heater 81 has a heater inlet 811 and a heater outlet 812. The heater inlet 811 is connected to an outlet 202 of the engine 20, the heater outlet 812 is connected to an inlet 871 of the heater core 87, and an inlet 201 of the engine 20 is connected to an outlet 872 of the heater core 87. In other words, an outlet conduit 84 of the engine 20 is connected to the heater inlet 811 of the heater 81, and an inlet conduit 86 of the engine 20 is connected to the outlet of the heater core 87. The heater outlet 812 of the heater 81 is connected to an inlet 871 of the heater core 87 by an outlet conduit 85 of the heater 81. That is, the heater 81 is connected to the engine 20 and the heater core 87 respectively to form water cycle, the heat generated by the engine 20 is transferred to the heater 81 by the circulating water, and then to the heater core 87 for heating, thereby reducing the heat buildup at the engine 20 quickly, and the heat generated by the engine 20 is quickly provided to the heater core 87 to heat the hybrid vehicle so as to improve the utilization of energy. The engine 20 and the heater core 81 are connected to the heater 87 in a series manner, when the heat produced by the engine 20 is insufficient to provide the heat to the heater core 87, the heater 81 is operated to provide more heat and improve the comfort inside the hybrid vehicle, and reduce energy consumption.

In some embodiments, the heater 81 is disposed above the engine 20 and near the heater core 87 of the air-conditioning system of the hybrid vehicle, whereby with a short water cycle and less heat loss, the water cycle efficiency among the heater 81 the heater core 87 and the engine 20 is improved, thereby increasing the cooling efficiency of the engine, and the heating efficiency of the heater core 87 is also improved, which may improve the hybrid vehicle's stability and comfort.

In some embodiments, as shown in FIG. 5, in order to improve the efficiency of the water cycle and the heat efficiency of the engine 20 and the heater core 87, an electric water pump 88 is provided between the inlet 201 of the engine 20 and the heater inlet 811. That is, the electric water pump 88 is disposed on the outlet conduit 84 of the engine 20, so that when the engine does not provide heat, the electric water pump 88 is started to provide heat, which may improve the hybrid vehicle's comfort, and facilitate the usage of the hybrid vehicle. When the engine is started but does not provide enough heat, the heater is turned on with no need to start the electric water pump. When the hybrid vehicle is stopped, it is more energy efficient and environmental friendly using the heater to provide heat.

In some embodiments, the heater 81 is disposed on the rear inside of a right side wheel housing 111 of the sheet metal 11, which may improve the convenience of the assembly and maintenance of the heater 81.

The heater 81 is disposed on the rear inside of the right side wheel housing 111 of the sheet metal 11, and connected in series in the cooling circuit of the engine. That is, when the outlet conduit 84 of the engine 20 is connected to the heater inlet 811 of the heater 81, and the electric water pump 88 is disposed on the outlet conduit 84 of the engine 20, the outlet conduit 85 of the heater 81 is connected to the heater core 87, the outlet 872 of the heater core 87 is connected to the inlet conduit 86 of the engine 20. With the heater 81 is disposed on the rear inside of the right side wheel housing 111 of the sheet metal 11, the conduit is short and the heat loss is reduced, which may improve the heating efficiency, improve the comfort of the hybrid vehicle.

Figure 6:
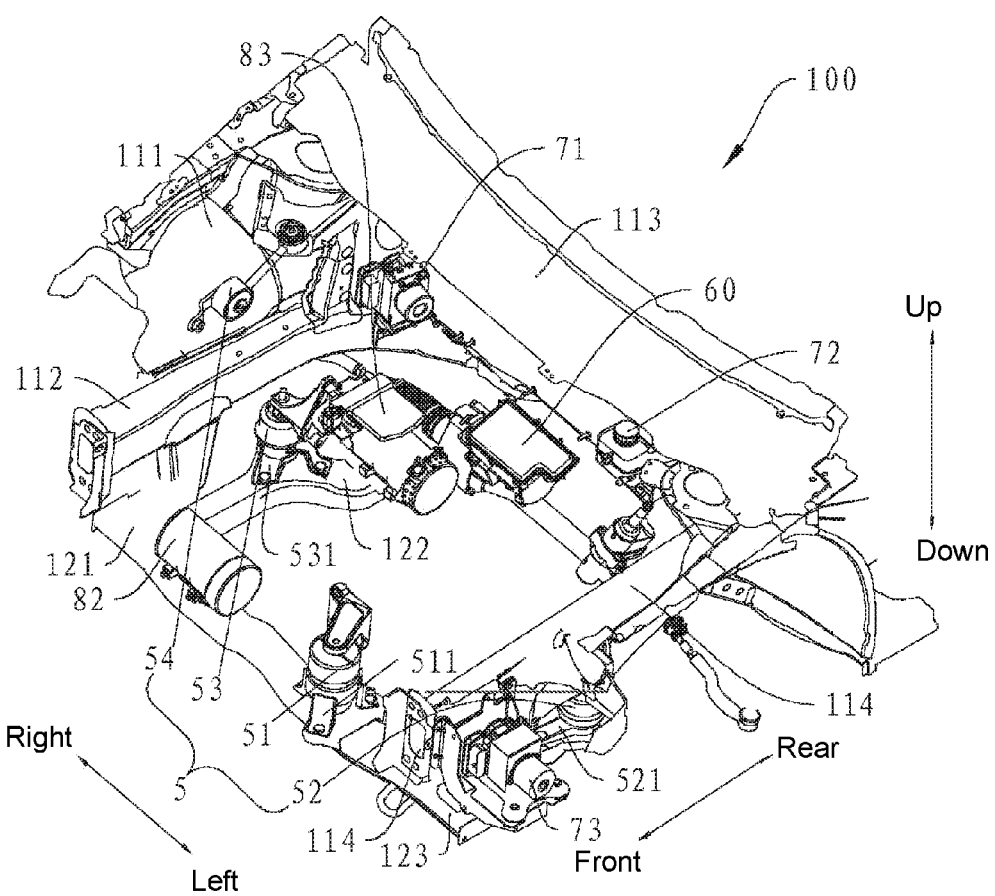
FIG. 6 is a schematic partial view of a front cabin of a hybrid vehicle according to an embodiment of the present disclosure.

In some embodiments, as shown in FIG. 6, the hybrid vehicle has an air conditioning system including an electric compressor 82 and a mechanical compressor 83. The electric compressor 82 and the mechanical compressor 83 are located in the front cabin respectively. In other words, the air conditioning system includes an air conditioning heating system and an air conditioning cooling system. The air conditioning heating system includes a heater 81, and the heater 81 is disposed on the rear inside of a right side wheel housing 111 of the sheet metal 11. The heater 81 is configured as a PTC (Positive Temperature Coefficient) heater. The air conditioning cooling system includes the electric compressor 82 and the mechanical compressor 83, and the electric compressor 82 and the mechanical compressor 83 are disposed on the front cabin. When the hybrid vehicle is operated normally, the engine 20 produces heat. When the engine is not operated to produce heat, the heater 81 is operated to produce heat, which may improve the comfort of the hybrid vehicle and facilitate the usage of the hybrid vehicle. When the hybrid vehicle is stopped, it is more energy efficient to use the heater to produce heat.

In some embodiments, the electric compressor 82 is provided at the front side of the front cabin 100, and the mechanical compressor 83 is provided at the rear side of the front cabin 100.

In some embodiments, as shown in FIGS. 1 and 7, the electric compressor 82 is mounted on the engine 20 by an electric compressor mounting bracket 117, and the mechanical compressor 83 is mounted on the engine 20 by a mechanical compressor mounting bracket 118, which may reduce the vibration of the hybrid vehicle and improve the comfort of the hybrid vehicle.

The electric compressor 82 and the mechanical compressor 83 are disposed on the right side of the front cabin 100, so that the front cabin is reasonably arranged.

In some embodiments, the electric compressor 82 is disposed on the front of the engine 20, and the mechanical compressor 83 is disposed on the rear of the engine 20, so that the weight distribution of the front cabin 100 is balanced to improve the structure stability of the front cabin 100.

In some embodiments, when the engine 20 is not started, the electric compressor 82 is operated to cool the temperature, which may improve the comfort of the hybrid vehicle and reduce the energy consumption.

In some embodiments, when the engine 20 is started, the mechanical compressor 83 is operated to cool the temperature, which may ensure the continuous cooling when the hybrid vehicle is ideal or the battery value is insufficient, and improve the comfort of the hybrid vehicle.

In some embodiments, the electric compressor 82 is powered by a power battery in priority. But when the electric quantity of the power battery is insufficient, the electric compressor 82 is powered by the motor for generating electricity or boosting the low-voltage, thereby reducing energy consumption and saving energy.

In some embodiments, as shown in FIG. 4, an air filter 21 is connected to the engine 20 and an air filter inlet 211 of the air filter 21 is fixed on the tank cross member.

In some embodiments, as shown in FIGS. 2, 6 and 7, the support assembly 5 includes a front suspension 51, a left suspension 52, a right suspension 53 and a suspension rod 54. The front suspension 51 is provided on a front beam 121 of the front subframe 12. The left suspension 52 is provided on a left beam 123 of the front subframe 12. The right suspension 53 is provided on a right beam 122 of the front subframe 12, and the suspension rod 54 is provided on the sheet metal 11. Through the front suspension 51, the left suspension 52, the right suspension 53 and the suspension rod 54, a powertrain of the hybrid vehicle is securely mounted in the front cabin, and the vibration of the hybrid vehicle is reduced, and security and comfort of the hybrid vehicle are improved.

In some embodiments, the front suspension 51, the left suspension 52, the right suspension 53 and the suspension 54 are configured for supporting the powertrain. The left suspension 52 and the front suspension 51 are configured to support the motor housing of the motor and the transmission housing of the transmission which are formed integrally. The right suspension 53 and the suspension rod 54 are configured to support the engine 20.

In some embodiments, as shown in FIGS. 6 and 7, the front suspension 51 is connected to the front beam 121 of the front subframe 12 by a front suspension bracket 511. The left suspension 52 is connected to the left beam 123 of the front subframe 12 by a left suspension bracket 521. The right suspension 53 is connected to the right beam 122 of the front subframe 12 by a right suspension bracket 531. The suspension rod 54 is disposed on the top of the right wheel housing 111 of the sheet metal 11. In other words, the front suspension bracket 511 is disposed on the front beam 121 of the front subframe 12, and the front suspension 51 is mounted on the front beam 121 by the front suspension bracket 511. The left suspension bracket 521 is disposed on the left beam 123 of the front subframe 12, and the left suspension 52 is mounted on the left beam 123 by the left suspension bracket 521. The right suspension bracket 531 is disposed on the right beam 122 of the front subframe 12, and the right suspension 53 is mounted on the right beam 122 by the right suspension bracket 531. The suspension rod 54 is mounted on the top of the right wheel housing 111 of the sheet metal 11. The mounting efficiency of the front cabin 100 and the stability of the components in the front cabin may be improved.

The front suspension 51, the left suspension 52, the right suspension 53 and the suspension rod 54 are disposed within the front cabin 100 to support the powertrain, thus the vibration of the hybrid vehicle is reduced, and security and comfort of the hybrid vehicle are improved.

In some embodiments, as shown in FIGS. 2 and 6, the front suspension 51 is configured to support the front portion of the transmission 40, the left suspension 52 is configured to support the left portion of the motor 30, the right suspension 53 and the suspension rod 54 are configured to support the right portion of the engine 20 respectively. The suspension rod 54 is dispose above the right suspension 53. Thereby, the powertrain formed by the engine 20, the motor 30 and the transmission 40 is securely mounted in the front cabin 100, the stability of the hybrid vehicle is improved, the vibration is reduced and the comfort is improved.

In some embodiments, because the housing of the transmission 40 and the housing of the motor 30 are formed integrally, and the motor 30 disposed above the transmission 40 shares the space of the front cabin 100, the position of the left suspension 52 and the right suspension 53 moves down and fixed on the subframe. The suspension rod 54 may restrict the swing of the powertrain assembly in the front and rear direction.

In addition, embodiments of the present disclosure also provided a hybrid vehicle including the front cabin 100 as described above.

In some embodiments, with the hybrid vehicle according to embodiments of the present disclosure, the motor 30, the engine 20 and the transmission 40 are reasonably arranged in the front cabin 100, which may improve the space utilization of the front cabin 100 and each components are securely disposed within the front cabin 100. And it also has the advantages of balancing the quality and temperature distribution, reducing the energy consumption and cost by combining the electric drive systems and fuel drive system. Besides, it also has the advantages of facilitating the integration of power from the engine 20 and motor 30, and power output of the transmission 40, thus improving the performance of the hybrid vehicle.

In addition, because the engine 20, the motor 30, transmission 40 and other components are reasonably arranged in the front cabin 100, it may solve the problems of space underutilization, uneven quality distribution, unbalanced temperature field and poor safety of the front cabin 100. And an electric drive system is connected in parallel to a traditional fuel drive system, so that the vehicle has the advantages of energy-saving and environmental protection.

In some embodiments, as shown in FIG. 6, a steering system of the hybrid vehicle is an electronic power steering system 60, and the electric power steering system 60 is provided on the front subframe 12. Thus, by the control of the electronic power steering system 60, the hybrid vehicle may steer quickly, which may improve the sensitivity and safety of the hybrid vehicle. And it facilitates the usage of the hybrid vehicle.

In some embodiments, as shown in FIG. 6, the hybrid vehicle includes a brake system. The brake system is an electro-hydraulic brake system, and the electro-hydraulic brake system includes an electronic stability control module 71, a brake operating unit 72, a hydraulic brake control module 73. The electronic stability control module 71 is provided at the rear inside of a right side longitudinal beam of a body 114 of the hybrid vehicle. The brake operating unit 72 is disposed on the dash plate 113 of the sheet metal 11, and the hydraulic brake control module 73 is provided on the anterolateral side of a left side longitudinal beam of a body 114 of the hybrid vehicle. Thereby the hybrid vehicle may brake quickly and the safety performance is improved.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A front cabin of a hybrid vehicle, comprising:
a sheet metal;
a front subframe; and an engine, a motor, a motor controller, a transmission and a support assembly; and wherein:

the engine and the motor are connected to the transmission respectively;

the engine is disposed on the right side of the front cabin;

the transmission is disposed on the left side of the front cabin and defines a mounting space with the sheet metal on the left side of the front cabin;

the motor is disposed on the left side of the front cabin and above the transmission and located within the rear side of the mounting space and behind the motor controller; and the motor controller is disposed on the left side of the front cabin and above the transmission and located within the front side of the mounting space and in front of the motor.

2. The front cabin of the hybrid vehicle according to claim 1, wherein a motor housing of the motor and a transmission housing of the transmission are formed integrally.

3. The front cabin of the hybrid vehicle according to claim 1, wherein a motor controller bracket is disposed on a left side longitudinal beam of a body of the hybrid vehicle, the motor controller is mounted on the left side longitudinal beam of the body by the motor controller bracket.

4. The hybrid vehicle, comprising a front cabin as claimed in claim 1.

* * * * *